United States Patent
Moseke et al.

(10) Patent No.: US 9,647,389 B2
(45) Date of Patent: May 9, 2017

(54) PLUG CONNECTOR PART COMPRISING A LOCKING ELEMENT

(71) Applicant: PHOENIX CONTACT E-Mobility GmbH, Schieder-Schwalenberg (DE)

(72) Inventors: Dirk Moseke, Hoexter-Luechtringen (DE); Marco Seelig, Leopoldshoehe (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 15/241,084

(22) Filed: Aug. 19, 2016

(65) Prior Publication Data

US 2017/0054249 A1     Feb. 23, 2017

(30) Foreign Application Priority Data

Aug. 21, 2015  (DE) .................. 10 2015 113 874

(51) Int. Cl.
| | |
|---|---|
| *H01R 13/62* | (2006.01) |
| *H01R 13/627* | (2006.01) |
| *H01R 13/639* | (2006.01) |

(52) U.S. Cl.
CPC ..... *H01R 13/6275* (2013.01); *H01R 13/6397* (2013.01)

(58) Field of Classification Search
CPC .............. H01R 13/639; H01R 13/6397; H01R 13/6275; B60L 11/1818
USPC .................. 439/304, 350, 352, 358
See application file for complete search history.

(56) References Cited

U.S. PATENT DOCUMENTS

| | | | |
|---|---|---|---|
| 8,647,134 B2* | 2/2014 | Schulte .............. | H01R 13/6397 439/304 |
| 2011/0034053 A1 | 2/2011 | Matsumoto et al. | |
| 2013/0047687 A1 | 2/2013 | Kurumizawa et al. | |
| 2013/0252448 A1* | 9/2013 | Schulte .............. | H01R 13/6397 439/304 |

FOREIGN PATENT DOCUMENTS

DE        102013204904 A1    9/2013

* cited by examiner

*Primary Examiner* — Khiem Nguyen
(74) *Attorney, Agent, or Firm* — Leydig, Voit & Mayer, Ltd.

(57) ABSTRACT

A plug connector part for connecting to an associated mating plug connector part includes a housing. A plug-in portion is arranged on the housing and can be plugged into the associated mating plug connector part in a plugging direction to engage with the mating plug connector part when in a connection position. At least one electrical contact element is arranged on the plug-in portion. The at least one electrical contact element is for making electrical contact with the mating plug connector part. A locking element is movably arranged on the housing. The locking element has a locking position for locking the plug connector part with respect to the mating plug connector part when in the connected position. The locking element can be moved out of the locking position to unlock the connection between the plug connector part and the mating plug connector part.

11 Claims, 5 Drawing Sheets

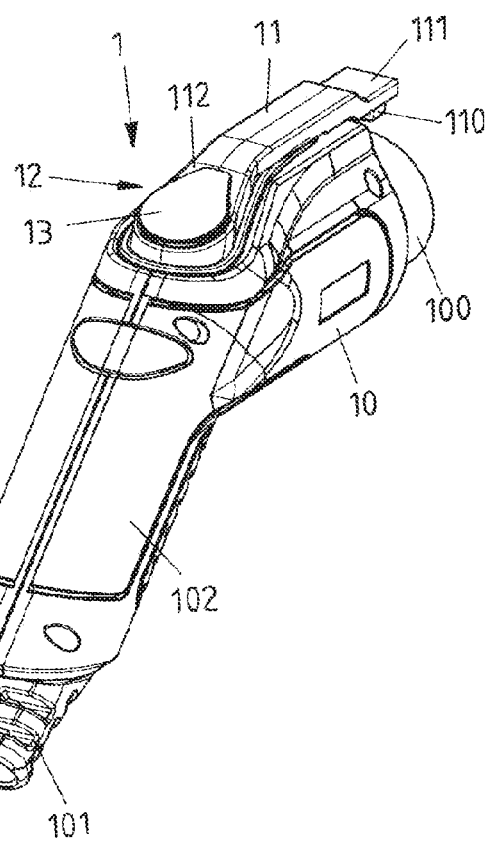
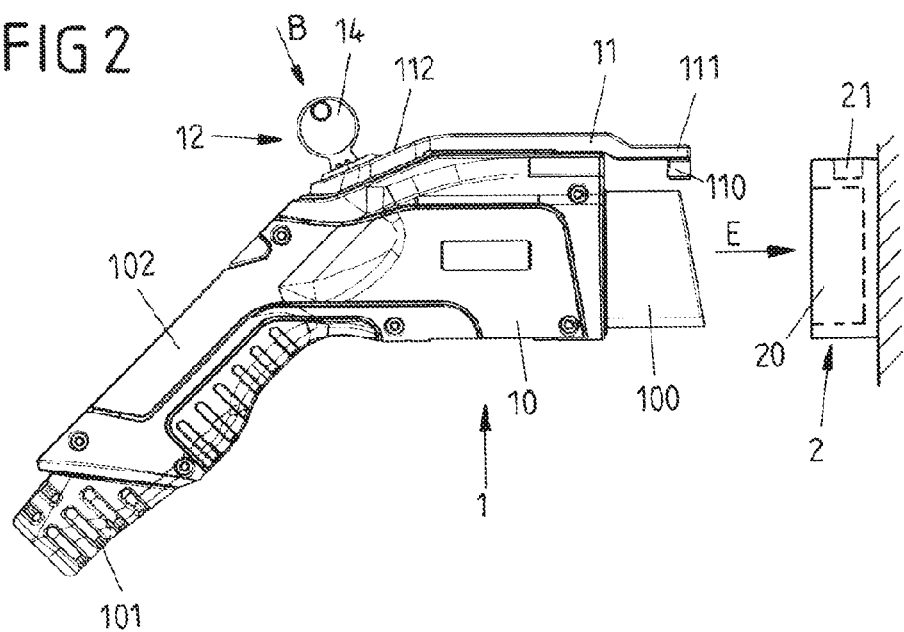

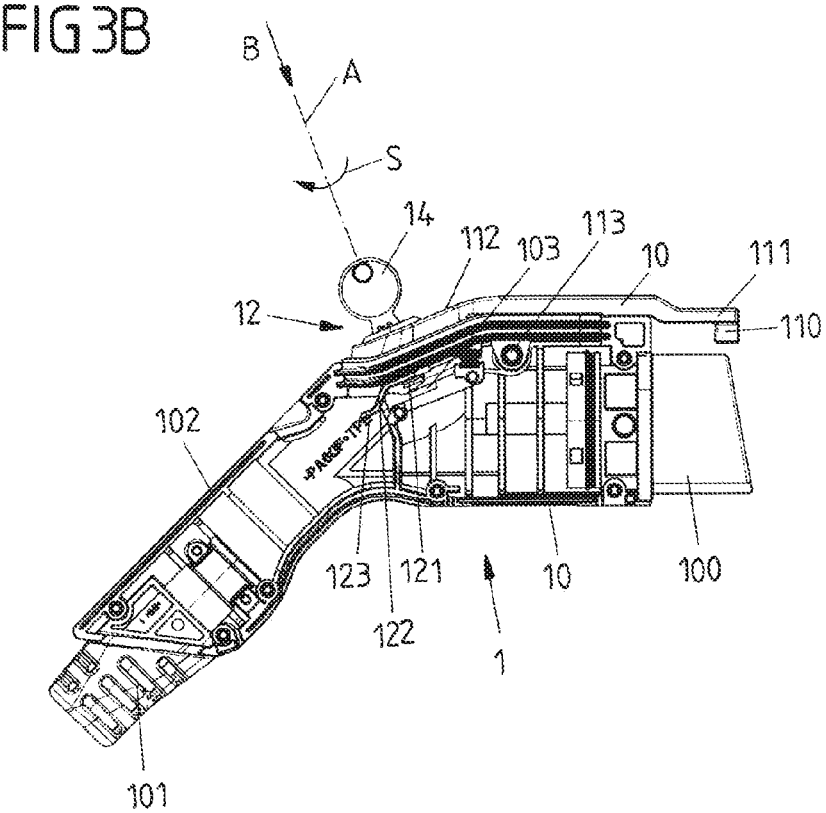
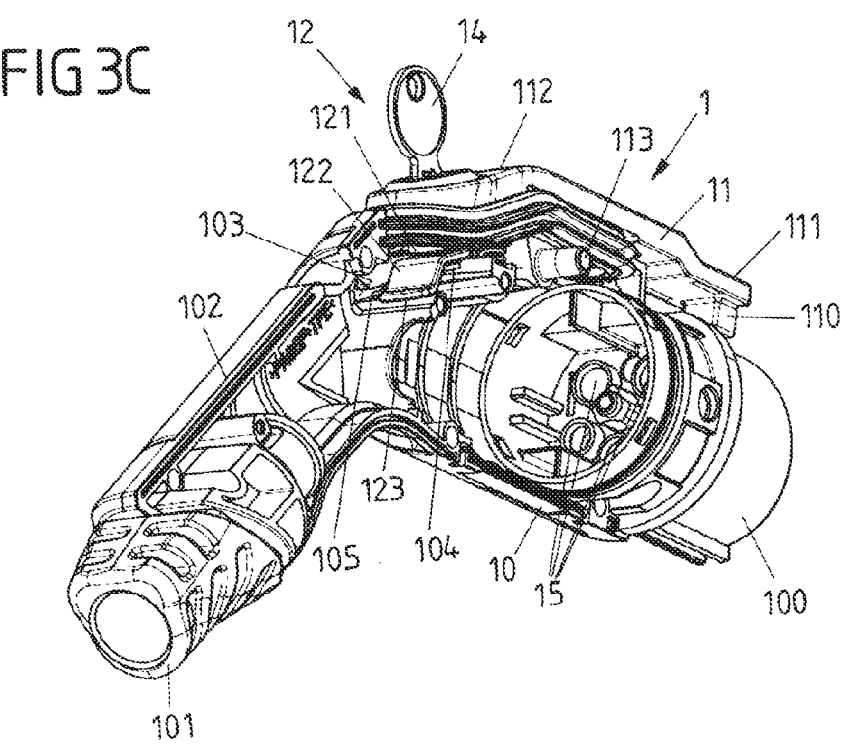

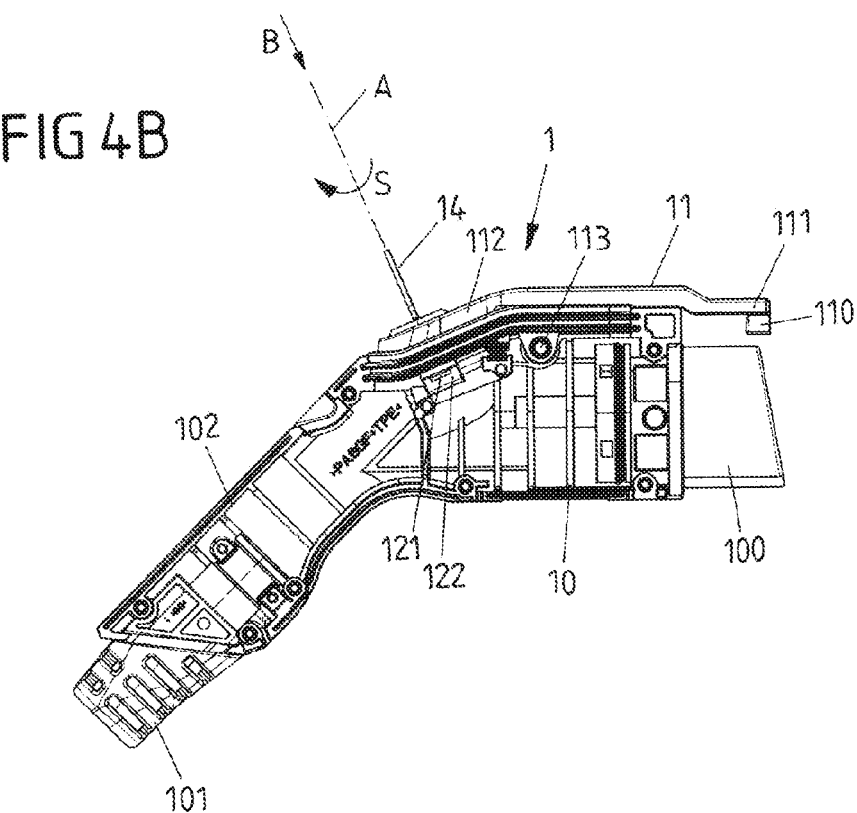
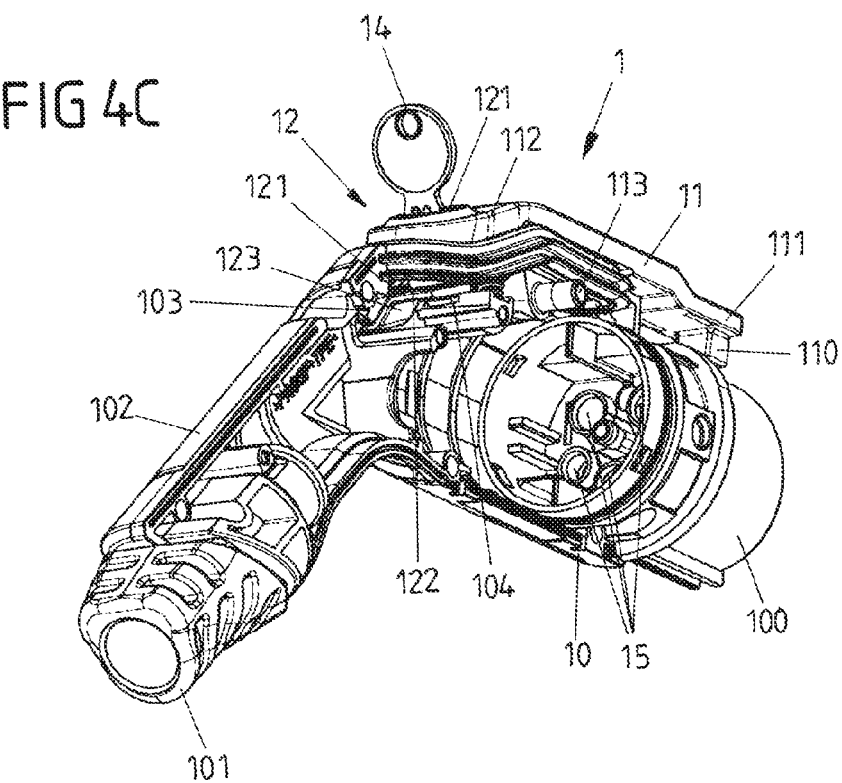

PLUG CONNECTOR PART COMPRISING A LOCKING ELEMENT

CROSS-REFERENCE TO PRIOR APPLICATION

Priority is claimed to German Patent Application No. DE 10 2015 113 874.3, filed on Aug. 21, 2015, the entire disclosure of which is hereby incorporated by reference herein.

FIELD

The invention relates to a plug connector part for connecting to an associated mating plug connector part.

BACKGROUND

Such a plug connector part comprises a housing and a plug-in portion that is arranged on the housing and can be plugged into an associated mating plug connector part in a plugging direction and engages with the mating plug connector part when in a connected position, at least one electrical contact element for making electrical contact with the mating plug connector part being arranged on the plug-in portion. A locking element is arranged on the housing in a movable manner and has a locking position for locking the plug connector part relative to the mating plug connector part in the connected position, and can be moved out of the locking position to release the connection between the plug connector part and the mating plug connector part.

Such a plug connector part can, for example, be designed as a charging plug on a charging system for charging an electrically operated vehicle (also called an electric vehicle). Such a plug connector part can, for example, be arranged on a charging cable and be intended to be plugged into a charging socket on a vehicle. In order to charge an electric vehicle, the charging plug is inserted into the charging socket and, when inserted, establishes an electrical connection for transmitting a charging current in the form of an alternating current or direct current.

In this context, the locking element serves to ensure that the plug connection part cannot be pulled out of the associated mating plug connection part unintentionally during a charging procedure, which would lead to an interruption of the charging procedure. Due to the locking provided by the locking element when the plug connector part is in the connected position with the mating plug connector part, the plug connector part is held in a defined position relative to the mating plug connector part and cannot be released from the mating plug connector part counter to the plugging direction.

It may be desirable for it to not be readily possible to release the locking by moving the locking element out of its locking position, for example to only allow authorized persons to remove the plug connector part from the mating plug connector part. Different locking devices are known from prior art in this context, which serve to block the locking element in its locking position.

In the case of a plug connector part known from US 2013/0047687 A1, for example, a locking device in the form of a lock actuated by a key is provided on a mating plug connector part associated with the plug connector part, which lock is designed to block the locking element when the plug connector part is inserted into the associated mating plug connector part. The locking between the plug connector part and the mating plug connector part is therefore blocked by the lock on the mating plug connector part.

In the case of a plug connector part known from US 2011/0034053 A1 in the form of a charging plug, a lock is provided on the housing of the plug connector part, which lock can be actuated between a blocking position and a releasing position and blocks a locking element of the plug connector part in the blocking position.

In the case of a plug connector part known from DE 10 2013 204 904 A1 in the form of a charging plug, a blocking device in the form of a lock is provided on a housing of the plug connector part, which lock can act on a locking element using a pawl in order to block the locking element in a locking position.

The blocking devices known from prior art allow only authorized users to release the locking of the plug connector part to an associated plug connector part. In the process, authorization is given by the use of a key that fits the lock and by means of which the lock can be operated and therefore the locking element can be unlocked, so the locking between the plug connector part and the mating plug connector part can be released and the plug connector part can be removed from the mating plug connector part. In this case, it can be disadvantageous that such a blocking device in the form of a lock requires installation space, in particular if it is provided on the housing of the plug connector part and has parts that have to move inside the housing such as a pawl or similar.

SUMMARY

A plug connector part for connecting to an associated mating plug connector part includes a housing. A plug-in portion is arranged on the housing and can be plugged into the associated mating plug connector part in a plugging direction to engage with the mating plug connector part when in a connection position. At least one electrical contact element is arranged on the plug-in portion. The at least one electrical contact element is for making electrical contact with the mating plug connector part. A locking element is movably arranged on the housing. The locking element has a locking position for locking the plug connector part with respect to the mating plug connector part when in the connected position. The locking element can be moved out of the locking position to unlock the connection between the plug connector part and the mating plug connector part. The plug connector part includes a blocking device for blocking the locking element in the locking position, the blocking device having a closure element arranged on the locking element. The blocking device can be moved relative to the locking element between a blocking position, in which the locking element is blocked in its locking position, and a releasing position, in which the locking element can be moved out of the locking position.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 is a perspective view of a plug connector part in the form of a charging plug with a locking element arranged thereon;

FIG. 2 is a side view of the plug connector part with a key inserted into a lock cylinder of the locking element;

FIG. 3B is a partially cut away side view of the plug connector part in the releasing position of the lock cylinder;

FIG. 3C is a partially cut away perspective view of the plug connector part in the releasing position of the lock cylinder;

FIG. 4B is a partially cut away side view of the plug connector part in the blocking position of the lock cylinder; and FIG. 4C is a partially cut away perspective view of the plug connector part in the blocking position of the lock cylinder.

DETAILED DESCRIPTION

Figure 3A:
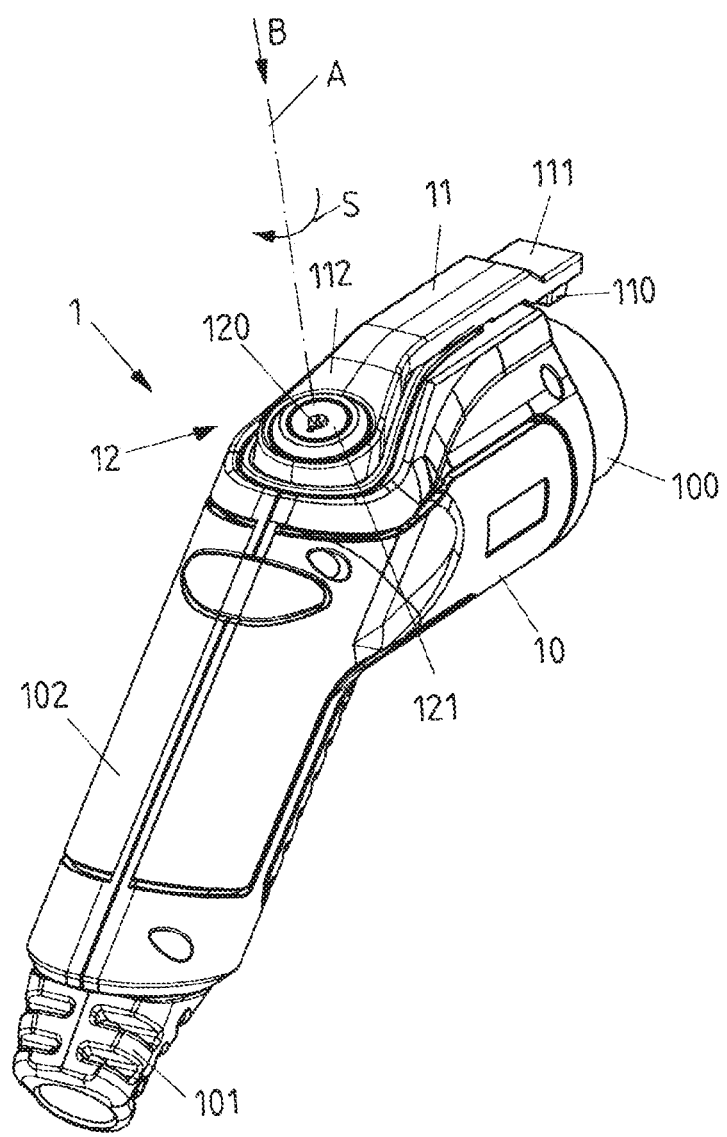
FIG. 3A is a perspective view of the plug connector part in a releasing position of the lock cylinder.

In an embodiment, the plug connector part has a blocking device for blocking the locking element in the locking position. The blocking device comprises a closure element that is arranged on the locking element and can be moved relative to the locking element between a blocking position, in which the locking element is blocked in its locking position, and a releasing position, in which the locking element can be moved out of the locking position.

Accordingly, the blocking device is arranged on the locking element and is consequently moved together with the locking element during a movement of the locking element, for example during a pivoting of the locking element if the locking element is pivotally arranged on the housing of the plug connector part. Because the blocking device is therefore integrated in the locking element, space can be saved inside the housing of the plug connector part, which can be used, for example, for installing a cable or similar.

The blocking device has a closure element, which can be moved relative to the locking element between a blocking position and a releasing position. The closure element can, for example, be arranged on the locking element so as to be rotatable about an axis of rotation and can be moved between the blocking position and the releasing position by means of rotation about the axis of rotation. In the blocking position, the closure element can block the locking element in this manner, such that the locking element cannot be moved out of its locking position. In the releasing position, on the other hand, the locking element can be unlocked such that the connection between the plug connector part and the mating plug connector part can be released.

In one embodiment, the closure element is formed by a lock cylinder, which can be rotated by means of a key. The blocking device is in this case designed as a lock and has a lock cylinder which can only be actuated by a key that fits, so only an authorized user who has the key that fits can unlock the blocking device and thus release the connection between the plug connector part and the mating plug connector part.

A key of this kind can be inserted in the manner that is known per se into a keyhole of the lock cylinder and unlocks the lock cylinder if the key fits, such that the lock cylinder can be moved by rotating the key.

Such a lock can, for example, be constructed as a flat lock and can therefore be integrated in the locking element such that substantially no additional installation space has to be provided inside the housing in order to integrate the blocking device in the plug connector part.

In an advantageous embodiment, the blocking device has a blocking element, which is connected to the closure element and can be rotated together with the closure element, for example in the form of a pawl, which interlocks with a blocking portion of the housing in the blocking position in order to block a movement of the locking element out of the locking position. Because the blocking element interlocks with an associated blocking portion of the housing when the blocking device is in the blocking position, the locking element cannot be moved relative to the housing when the blocking device is blocked, and is thus fixed relative to the housing such that the locking between the plug connector part and the mating plug connector part cannot be released. A movement of the locking element relative to the housing is only possible when the interlocking connection between the blocking element and the blocking portion of the housing is released by actuation of the blocking device, so the locking between the plug connector part and the mating plug connector part can be released.

For example, the closure element can be adjustable by an angle of between 60° and 120°, for example 90°, in order to move the closure element between the blocking position and the releasing position. This allows simple operation by a user. Moreover, this allows for a sufficiently large angle of adjustment in order to bring the blocking element into an interlocking position with the housing or to release it from the interlocking position.

In an advantageous embodiment, the adjustment path of the closure element of the blocking device is limited by stops, which define the blocking position and the releasing position. Such stops can, for example, be provided on the locking element. It is, however, also feasible and possible to arrange such stops on the housing. In the process, when in its blocking position, the closure element abuts a first stop. On the other hand, the closure element comes to abut a second stop when the closure element is transferred into its releasing position.

In one embodiment, the locking element can be arranged on the housing so it can pivot about a pivot pin. In the process, the locking element can, for example, have a locking portion on one end for locking with the mating plug connector part in the connected position and can be actuated by means of an actuation portion on an end located away from the locking portion. The actuation portion can, for example, be accessible to a user from the outside such that a user can, for example, press on the actuation portion from the outside in order to thus pivot the locking element, for example, about its pivot pin and to move it out of its locking position.

Advantageously, the locking element is spring-loaded in the process toward its locking position such that the locking element automatically reaches its locking position when the plug connector part is engaged in a plugged manner with the associated mating plug connector part. In order to release the locking, a user can, for example, press on the actuation portion, in order to thus pivot the locking element and to release the locking.

In a specific embodiment, the blocking device can, for example, be arranged in the form of a lock cylinder of a lock on the actuation portion. If the blocking device is blocking, the actuation portion can therefore not be moved relative to the housing. It is only when the blocking device is released that a user can press on the actuation portion in order to thus move the locking element.

Figure 4A:
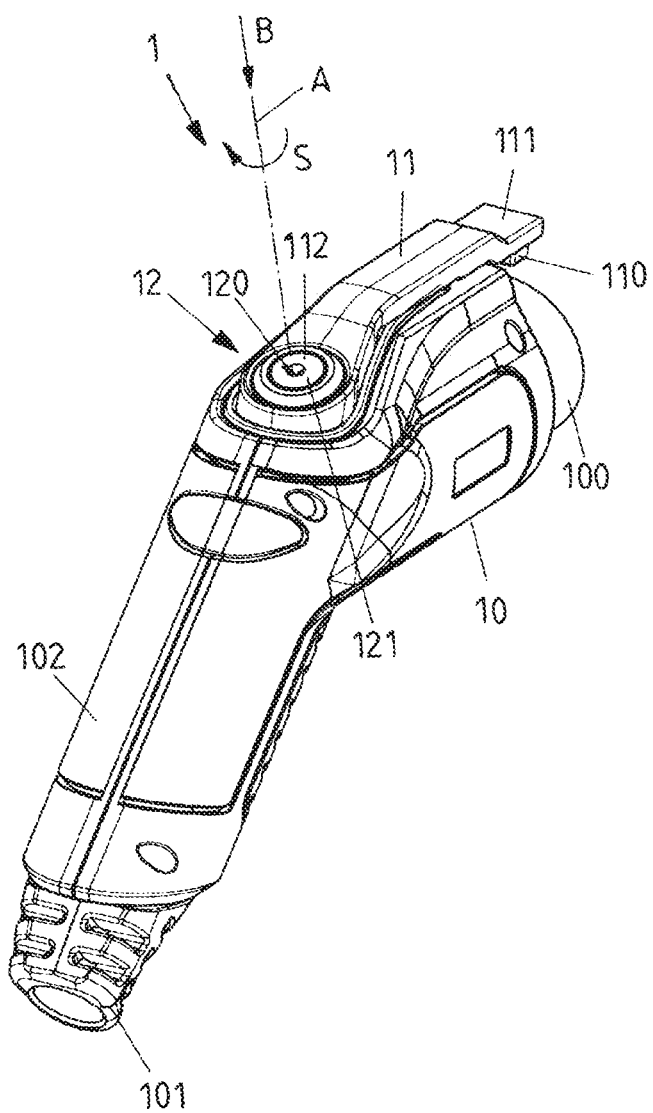
FIG. 4A is a perspective view of the plug connector part in a blocking position of the lock cylinder.

FIGS. 1 to 4A-4C show an embodiment of a plug connector part 1 in the form of a charging plug, which can be engaged in a plugged manner with an associated mating plug connector part 2 in the form of a charging socket, for example on a vehicle, in a plugging direction E (see FIG. 2). The plug connector part 1 has a housing 10, on a front end of which a plug-in portion 100 is arranged, which can be inserted into a plug opening 20 in the mating plug connector part 2 in the plugging direction E.

On the plug-in portion 100, contact elements 15 (see FIG. 3C and 4C) are arranged, which make electrical contact with the mating plug connector part 2 when the plug connector part 1 is connected and thus establish an electrical connection between the plug connector part 1 and the mating plug connector part 2, via which connection a charging current, for example in the form of an alternating current, can be transmitted.

On an end facing away from the plug-in portion 100, the housing 10 has a handle 102 extending obliquely to the plugging direction E to which a cable outlet 101 connects. A cable is passed out of the plug connector part 1 through the cable outlet 101.

On the housing 10, a locking element 11 is provided, which can be pivoted about a pivot pin 113 (see FIG. 3B, 3C and 4B, 4C) and has a locking portion 110 on an end 111 facing the mating plug connector part 2 in the form of a detent, which locks with an engagement lock 21 of the mating plug connector part 2 when the plug connector part 1 is plugged into the mating plug connector part 2 such that the connection between the plug connector part 1 and the mating plug connector part 2 is locked and, in particular, the plug connector part 1 cannot be removed from the mating plug connector part 2 counter to the plugging direction E as long as the plug connector part 1 is locked with the mating plug connector part 2 by means of the locking element 11.

The locking element 11 is spring-loaded toward its locking position relative to the housing 10 such that when the plug connector part 1 is inserted into the mating plug connector part 2, the locking is produced automatically.

The locking portion 110 is arranged on a first lever arm of the locking element 11 extending from the pivot pin 113 toward the plug-in portion 100. On a second lever arm extending toward the handle 102 on the other hand, an actuation portion 112 is formed, which is accessible to a user from the outside and on which a user can press in an actuation direction B in order to pivot the locking element 11 about the pivot pin 113 and release the locking with the mating plug connector part 2. In order to remove the plug connector part 1 from the mating plug connector part 2, a user can therefore press on the actuation portion 112 in order to release the locking and can then pull the plug connector part 1 out of the mating plug connector part 2 counter to the plugging direction E.

In the embodiment shown, a blocking device 12 in the form of a lock is arranged on the actuation portion 112, which lock can be actuated using a key 14 and is covered externally when in the non-actuated state by means of a cap element 13 (see FIG. 1). The cap element 13 can, for example, be designed as a rubber cap and can be attached to the blocking device 12 such that the blocking device 12 is not visible from the outside when no key 14 has been inserted into the blocking device 12 and in particular is protected from dirt and moisture.

The blocking device 12 has a lock cylinder 121 with a keyhole 120 into which the key 14 can be inserted. The lock cylinder 121 is arranged on the locking element 11 such that it can be rotated about an axis of rotation A and is coded such that rotation of the lock cylinder 121 about the axis of rotation A is only possible using a key that fits. Therefore, only an authorized user who has a key 14 that fits can operate the lock cylinder 121.

As can be seen in particular from the partially cut away views according to FIG. 3B and 3C as well as FIG. 4D and 4C, a blocking element 122 in the form of a pawl is arranged on an inner end of the lock cylinder 121 and is moved together therewith when said lock cylinder is rotated, and, when in a blocking position, is used to interlock with a blocking portion 103 in the form of a groove inside the housing 10 such that the locking element 11 cannot be moved out of its locking position.

By rotating the lock cylinder 121 in a closing direction S about the axis of rotation A between its releasing position (FIG. 3A to 3C) and its locking position (FIG. 4A to 4C), the blocking device 12 can be blocked (when rotating in the closing direction S) or unblocked (when rotating counter to the closing direction S). In the blocking position (FIG. 4A to 4C), the locking element 11 is fixed relative to the housing 10, such that it cannot be pivoted about its pivot pin 113, by one end 123 of the blocking element 122 engaging in the groove 103 in the housing 10. The locking of the plug connector part 1 with the mating plug connector part 2 is therefore secured such that the plug connector part 1 cannot be removed from the mating plug connector part 2.

By transferring the lock cylinder 121 together with the blocking element in the form of the pawl 122 arranged thereon into the releasing position (FIG. 3A to 3C) by rotating the key 14, the end 123 of the blocking element 122 is moved out of the blocking portion 103 in the form of the groove in the housing 10 such that the interlocking with the housing 10 is removed and the locking element 11 can be pivoted about the pivot pin 113. The locking of the plug connector part 1 with the mating plug connector part 2 can therefore be released.

In the embodiment shown, in order to move the lock cylinder 121 between the blocking position and the releasing position, the key 14 is rotated by an angle of approximately 90°. As a result of this, the blocking element 122 is rotated accordingly by 90°.

In this case, the blocking position and the releasing position in the embodiment shown are defined by stops 104, 105 arranged on the housing 10. In the process, the blocking element 122 abuts a first stop 104 when in the releasing position (see FIG. 3C). On the other hand, the end 123 of the blocking element 122 abuts a second stop 105 inside the blocking portion 103 in the form of the groove when in the blocking position (see FIG. 4C).

Because the blocking device 12 is arranged on the locking element 11, in particular on the actuation portion 112 of the locking element 11, installation space inside the housing 10 can be saved. In the process, the blocking device 12 can be designed as a flat lock and can therefore be integrated to the greatest possible extent in the locking element 11, in particular in the actuation portion 112 of the locking element 11.

The idea on which the invention is based is not limited to the embodiments described above but can in principle also be implemented by quite different embodiments.

In principle, a plug connector part of the kind described here can be used not only as a charging plug in a charging system for charging an electrically operated vehicle (electric vehicle) but can also be used in quite different ways.

In principle the locking element can be pivoting or sliding. In this respect, the embodiment shown having a pivoting locking element should only be understood as an example.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Plug connector part
10 Housing
100 Plug-in portion
101 Cable outlet
102 Handle
103 Blocking portion (groove)
104, 105 Stop
11 Locking element
110 Locking portion
111 End
112 Actuation portion
113 Pivot pin
12 Lock
120 Keyhole
121 Closure element (lock cylinder)
122 Blocking element
123 End
13 Cap element
14 Key
15 Contact elements
2 Mating plug connector part
20 Plug-in opening
21 Engagement lock
A Axis of rotation
B Actuation direction
E Plugging direction
S Closing direction

What is claimed is:

1. A plug connector part for connecting to an associated mating plug connector part, comprising:
a housing;
a plug-in portion that is arranged on the housing, the plug-in portion being configured to be plugged into the associated mating plug connector part in a plugging direction and to engage with the mating plug connector part when in a connection position, at least one electrical contact element being arranged on the plug-in portion, the at least one electrical contact element being configured to make electrical contact with the mating plug connector part;
a locking element movably arranged on the housing, the locking element having a locking position for locking the plug connector part with respect to the mating plug connector part when in the connected position, the locking element being configured to be moved out of the locking position to unlock the connection between the plug connector part and the mating plug connector part; and
a blocking device configured to block the locking element in the locking position, the blocking device having a closure element arranged on the locking element, the blocking device being configured to be moved relative to the locking element between a blocking position, in which the locking element is blocked in its locking position, and a releasing position, in which the locking element is configured to be moved out of the locking position.

2. The plug connector part according to claim 1, wherein the closure element is configured to be rotated about an axis of rotation relative to the locking element.

3. The plug connector part according to claim 1, wherein the closure element comprises a lock cylinder configured to be rotated by a key.

4. The plug connector part according to claim 1, wherein the blocking device has a blocking element connected to the closure element, the blocking element being configured to be rotated together with the closure element and configured to interlock with a blocking portion of the housing when in the blocking position to block a movement of the locking element out of the locking position.

5. The plug connector part according to claim 1, wherein the closure element is configured to be rotated by an angle of between 60° and 120° between the blocking position and the releasing position.

6. The plug connector part according to claim 5, wherein the angle is 90°.

7. The plug connector part according to claim 1, wherein, when in the blocking position, the closure element abuts a first stop of at least one of the housing or of the locking element and, when in the releasing position, abuts a second stop of at least one of the housing or of the locking element.

8. The plug connector part according to claim 1, wherein the locking element is arranged on the housing and is configured to pivot about a pivot pin.

9. The plug connector part according to claim 1, wherein one end of the locking element has a locking portion configured to lock with the mating plug connector part when in the connected position.

10. The plug connector part according to claim 9, wherein, on an end facing away from the locking portion, the locking element has an actuation portion configured to be actuated in an actuation direction so as to move the locking element out of its locking position.

11. The plug connector part according to claim 10, wherein the blocking device is arranged on the actuation portion.

* * * * *